Aug. 19, 1969 W. O. HARNISH ET AL 3,462,206

REEL-STORAGE BOX

Filed Oct. 30, 1967 2 Sheets-Sheet 1

INVENTORS
WAYNE O. HARNISH
WILLIAM F. NETTEKOVEN
BY Carpenter, Kinney & Coulter
ATTORNEYS

REEL-STORAGE BOX

Filed Oct. 30, 1967 2 Sheets-Sheet 2

INVENTORS
WAYNE O. HARNISH
WILLIAM F. NETTEKOVEN
BY
Carpenter, Kinney & Coulter
ATTORNEYS United States Patent Office 3,462,206
Patented Aug. 19, 1969

3,462,206
REEL-STORAGE BOX

Wayne O. Harnish and William F. Nettekoven, St. Paul, Minn., assignors to Minnesota Mining and Manufacturing Company, St. Paul, Minn., a corporation of Delaware Filed Oct. 30, 1967, Ser. No. 678,811
Int. Cl. A47b *81/06;* A47f *1/04;* G11b *1/00*
U.S. Cl. 312—17 9 Claims

ABSTRACT OF THE DISCLOSURE

Thin rectangular reel-storage box having both a broad hinged panel which opens for removal of a stored reel from a side of the box as well as a narrow hinged door which opens for removal of a stored reel through the front. A plurality of the boxes may be assembled in bookshelf fashion and a desired reel removed simply by opening the door of the box in which it is stored.

This invention relates to a box for storing reels of magnetic recording tape, motion picture film, microfilm, or the like.

Background of the invention

Reels for magnetic tape recorders are commonly stored in rectangular boxes made of plastic or cardboard, preferably plastic because cardboard boxes produce cardboard dust. A side panel may be hinged for easy removal of the reel of tape. The user normally stores the boxes on edge on a shelf like a collection of books. When he wishes to use a reel of tape, he removes a box from the shelf, opens it and removes the reel.

In order to provide more convenient access to the reels of tape, arrangements have been devised wherein a plurality of tape reel boxes are fastened together in side-by-side bookshelf fashion as shown in British Patent No. 1,075,738 or Drobny U.S. Patent No. 3,316,039. Each of these has a hinged front which drops down, whereupon the stored reel moves forward and is readily grasped, so that in almost a single motion, one is able to remove the reel from storage and place it on his tape recorder.

Many users of magnetic recording tapes are reluctant to adopt such bookshelf storage because they have become accustomed to boxes which can be handled individually. They might like the convenience of a bookshelf assembly but would prefer to be able to keep a few boxes of tape separate from the assembly and from time to time combine those boxes into the assembly.

Users of motion picture film and microfilm have the same need for more convenient reel-storage facilities.

Summary of the invention

The present invention provides boxes for reels of tape or film which are adapted for assembly into semipermanent bookshelf storage but can be individually removed from the assembly for separate use. The novel box is the first reel-storage box of which we are aware which has both a hinged panel at the side and a hinged front panel so that it either can be assembled with similar boxes into a bookcase storage system for removal of the reel without handling the box or can be used as an individual box with easy access to the reel through the hinged side panel. In spite of this versatility, the novel box is preferably constructed of only four simple plastic pieces which are easily put together by hand.

The major unit of the novel box is its container portion which has four integral walls, viz., one broad side wall, a narrow rear edge wall, and first and second narrow edge walls extending between the rear wall and the open front of the container. There is a post integral with the side wall and the first edge wall near a front corner of the container. A panel is hinged between the post and the rear wall along the first edge wall, and there are means for latching the panel at the second edge wall to close the open side of the container through which a stored reel may be removed when the panel is opened. The open front of the container is closed by a door hinged to the side wall at a front corner of the container, and there are means for latching the door at the edge wall opposite its hinge.

In a preferred embodiment of this invention, the door is hinged to a pin which projects from the side wall and is adjacent to the post. For optimum strength, a plate rigidly connects the projecting end of the pin to the post so that the door hinging means and the panel hinging means reinforce each other. The box includes means causing a stored reel to move forwardly of the open front of the container for easy removal when the door is opened and the box is standing upright on an edge wall. A preferred means for so moving the reel forwardly is a ramp projecting orthogonally from the side wall of the container, the ramp being inclined downwardly toward the front of the container from a short distance above the center of the edge wall on which the box is standing. The reel rests on the ramp and then rolls down the ramp when the door is opened. Both the post and the door hinge pin may be located at the lower front corner of the box to provide a stop restricting forward movement of the reel when it rolls down the ramp.

The drawing

Figure 3:
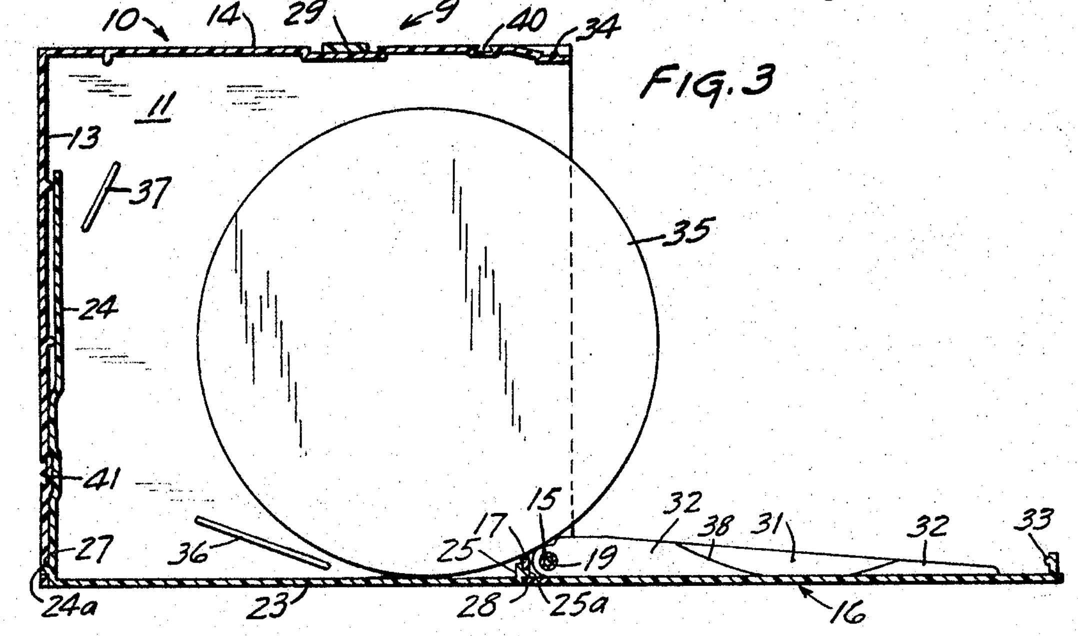
FIGURE 3 is a section along line 3—3 of FIGURE 2, with some reduction in scale.
Figure 4:
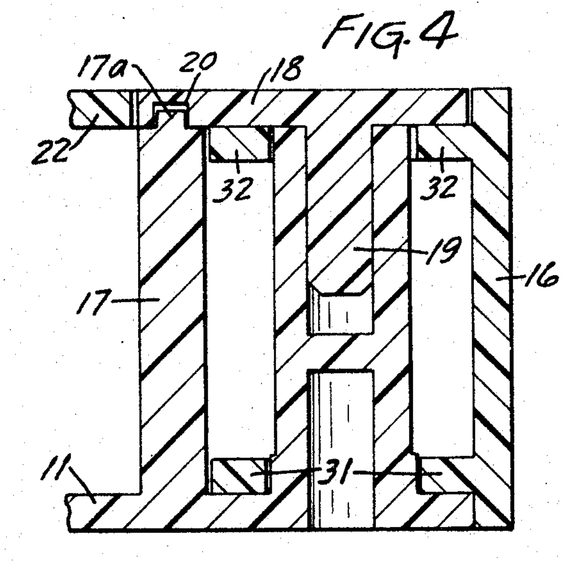
FIGURE 4 is an enlarged partial section along line 4—4 of FIGURE 1.

Referring to the drawing in detail, a box 9 has a container portion 10 which has four integral walls consisting of one broad side wall 11, a rear wall 13 and first and second edge walls 12, 14. The rear wall 13 and second edge wall 14 at the top of the container 10 extend the full width of the box 9, whereas the first edge wall 12 at the bottom of the container is truncated as shown in FIGURE 3. Projecting from the side wall 11 is a hinge pin 15 for a door 16 which closes the open front of the container 10. Integrally formed with the side wall 11 and the bottom edge wall 12 is a post 17. A plate 18 has a stud 19 which fits into and may be cemented to the hinge pin 15 and is also provided with a bore 20 into which a projection 17*a* of the post 17 fits, as seen in FIGURE 4.

Figure 5:
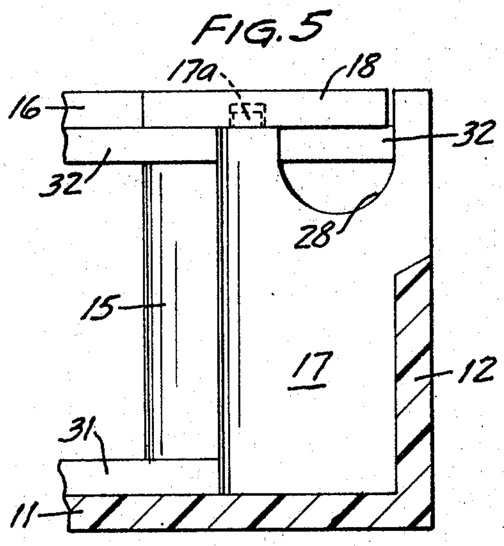
FIGURE 5 is an enlarged partial section along line 5—5 of FIGURE 1, wtih the side panel removed.

A hinged panel 22 closes the side of the container 10 and has a flange 23 which with the edge wall 12 encloses the bottom of the container (see FIGURE 3). As continuations of the flange 23, the panel 22 has a tapering flange 24 along the rear wall 13 and an abbreviated rib 25 near the front of the container, each of which carries a nipple 24*a*, 25*a*, respectively. The nipple 24*a* fits into a socket 27 in the rear wall 13 and the nipple 25*a* drops into a rabbet 28 in the post 17. The plate 18 covers the rabbet 28 to secure the hinging of the panel 22 (see FIGURE 5).

Figure 1:
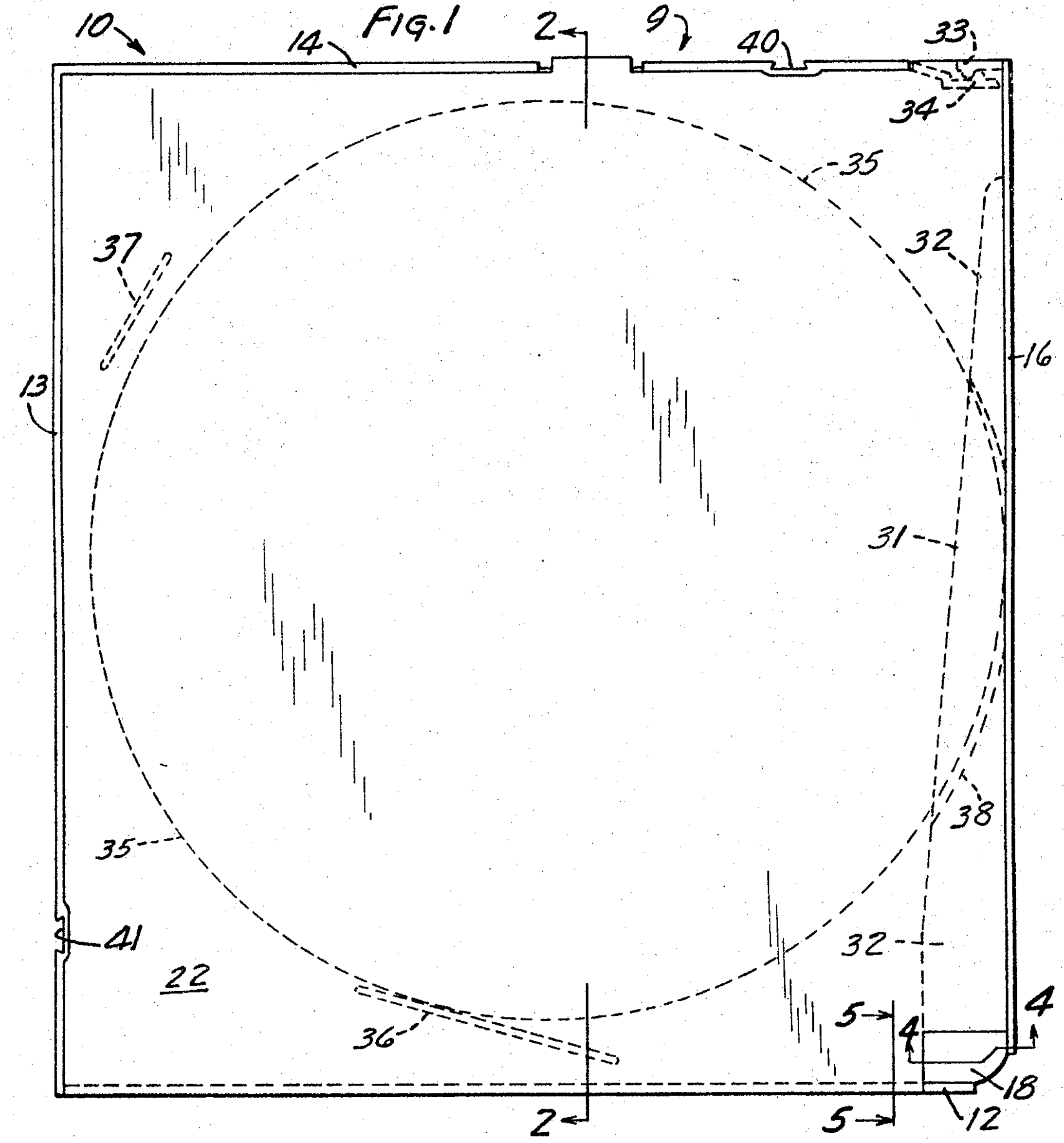
FIGURE 1 is a side elevation of a box embodying the invention.

Latch means are provided at the opposite end of the hinged panel 22 by a pawl 29 which cooperates with a detent 30 in the top wall 14. When the panel 22 is closed, it telescopes into the container 10 as shown in FIGURE 1. The door is hinged from a pair of flanges 31, 32 which respectively nest against the side wall 11 and the panel 22 when the panel is closed. Means for latching the door 16 are provided by a pawl 33 which cooperates with a detent 34 in the top wall 14.

Figure 2:
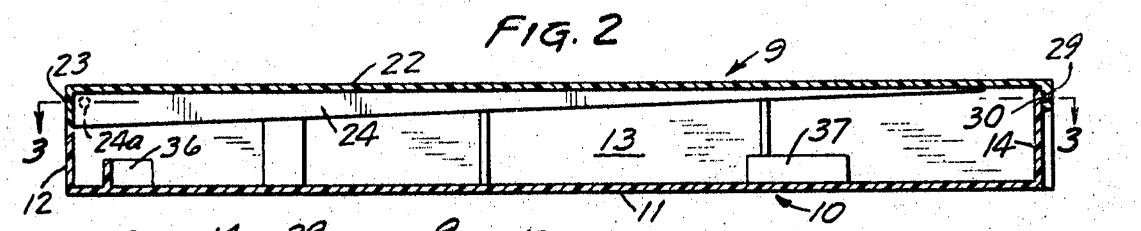
FIGURE 2 is a section along line 2—2 of FIGURE 1, with the reel removed.

With the box 9 standing upright on its bottom edge wall 12 and the panel 22 and door 16 closed to store a reel 35 as shown in FIGURE 1, the reel rests on an inclined ramp 36 which projects from the side wall 11. Another projection 37 from the side wall 11 acts as a stop to prevent the reel 35 from being forced against the rear wall 13. When the door 16 is opened, the reel 35 rolls forward down the ramp 36 and is stopped by the post 17 as shown in FIGURE 2. This enables one to easily grasp the reel to remove it through the front opening.

Alternatively, with the box 9 lying on its side wall 11 and the panel 22 opened, the reel of tape 35 may be lifted out of the box without opening the door 16, the flange 32 of the door being cut away at 38 to facilitate this.

Preferably the interior surfaces of the side wall 11 and the panel 22 are provided with ribs (not shown) in order that the reel may slide more easily into and out of the box and to reduce scratching of their surfaces and of the reel surfaces.

Assembly of the novel box

To assemble the box as shown in FIGURES 1–5, the door 16 is placed on its hinge pin 15. The panel 22 is put in place by inserting the nipple 24*a* into the socket 27 of the rear wall 13, and the other nipple 25*a* drops into the rabbet 28 in the post 17. Then the plate 18 is cemented to the hinge pin 15 and post 17 as shown in FIGURE 4, completing the assembly.

In view of the fact that the box 9 consists of only four plastic pieces, each of which may be molded in a simple conventional two-piece mold, and may be so easily assembled, it will be appreciated that this box can be produced at a cost not appreciably exceeding that of less versatile reel-storage boxes. Preferably the hinged panel 22 is molded of a transparent plastic such as polystyrene so that without opening the box one can inspect the reel and read any information which may be written on the side of the reel. The other pieces may be of the same or of any of the many plastics used in the art and may be colored in contrast to the transparent panel.

Bookshelf assembly

Figure 6:
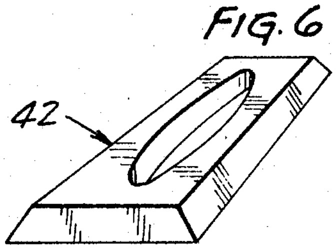
FIGURE 6 is a perspective view of a dowel suitable for joining two of the boxes of FIGURE 1 into a bookshelf assembly.

Each of the top wall 14 and rear wall 13 is provided with a slot 40, 41 of trapezoidal cross section. Into each of these slots may be inserted a dowel pin 42 as is illustrated in FIGURE 6. With a dowel pin extending from each slot into corresponding slots of an adjacent box, the two boxes are securely fastened together and additional boxes may be added in the same manner to provide an integral bookshelf assembly. Any box may be removed from the assembly simply by sliding the dowel pins out of the slots 40, 41.

We claim:

1. Box (9) for storing a reel (35) of tape or film comprising (1) a rectangular container (10) which has four integral walls including
  (a) one broad side wall (11),
  (b) a rear wall (13), and
  (c) first and second edge walls (12, 14) extending between the rear wall and the open front of the container;

(2) a post (17) integral with the side wall and the first edge wall near a front corner of the container;

(3) a panel (22) and means (25, 26, 27, 28) hinging the panel between the post and the rear wall along the first edge wall;

(4) means (29, 30) for latching the panel at the second edge wall to close the open side of the container through which a said reel may be removed when the panel is open;

(5) a door (16) and means (15, 31, 32) hinging the door to the side wall at a front corner of the container; and (6) means (33, 34) for latching the door at the edge wall opposite its hinge to close the open front of the container through which a said reel may be removed when the door is open.

2. A box as defined in claim 1 including means (36) causing a stored reel (35) to move forwardly of the open front of the container when the door (16) is opened and the box is standing upright on an edge wall (12).

3. A box as defined in claim 2 wherein the means for moving the reel forwardly is a ramp (36) projecting orthogonally from the side wall (11) of the container and inclining downwardly toward the front of the container from a short distance above the center of the first edge wall (12), and the reel rests on the ramp when the box stands upright on the first edge wall with the door (16) closed.

4. A box as defined in claim 1 wherein the door (16) is hinged to a pin (15) projecting from the side wall (11) and adjacent the post (17), and a plate (18) rigidly connects the projecting end of the pin to the post so that the door hinging means and the panel hinging means reinforce each other.

5. A box as defined in claim 4 wherein the post (17) is formed with a rabbet (28) and the panel has a pair of nipples **(24*a*, 25*a*), one of which fits into a socket (27)** in the rear wall and the other of which fits into the rabbet, and the plate covers the rabbet to secure the hinging when connecting the pin and the post.

6. A box as defined in claim 1 wherein there is a ramp (36) inclined from a point centrally above the first edge wall toward the lower front corner of the box when the box is standing upright on the first edge wall, and means (15, 17) located at the lower front corner for providing a stop restricting forward movement of a stored reel when the door is opened.

7. A box as defined in claim 1 wherein the first edge wall (12) is truncated, and a flange (23) on the hinged panel (22) encloses the container at that edge wall to the height of the second edge wall (14) and the rear wall (13).

8. A box as defined in claim 1 including means (40, 41, 42) for detachably connecting the box with a plurality of identical boxes to provide a bookshelf assembly from which any stored reel may be removed simply by opening the door (16) of the box containing the reel.

9. Method of constructing a box for storing reel of tape or film comprising the steps of:

(1) providing a container having four integral walls consisting of a broad side wall, rear wall, first and second edge walls extending between the rear wall and the open front of the container, a post integral with the side wall and first edge wall near a front corner of the container, which post is formed with a rabbet, and a hinge pin projecting from the side wall adjacent the post;

(2) journalling a door to the hinge pin;

(3) hinging a panel along the first edge wall between the rear wall and the rabbet in the post;

(4) attaching a plate to the projecting ends of the hinge pin and post and simultaneously covering the rabbet with the plate to secure the hinging of the panel at the post; and (5) providing means for latching the panel and for latching the door at the second edge wall.

References Cited

UNITED STATES PATENTS 3,389,942 6/1968 Jacob ---------------- 312—17

BOBBY R. GAY, Primary Examiner

J. L. KOHNEN, Assistant Examiner